(No Model.) 3 Sheets—Sheet 1.

W. PYLE.
TRACTION ELEVATED RAILWAY.

No. 318,027. Patented May 19, 1885.

WITNESSES:
N. H. Culver
John Burkhardt

INVENTOR
William Pyle
by his atty Joshua Pusey (No Model.) 3 Sheets—Sheet 2.
W. PYLE.
TRACTION ELEVATED RAILWAY.
No. 318,027. Patented May 19, 1885.
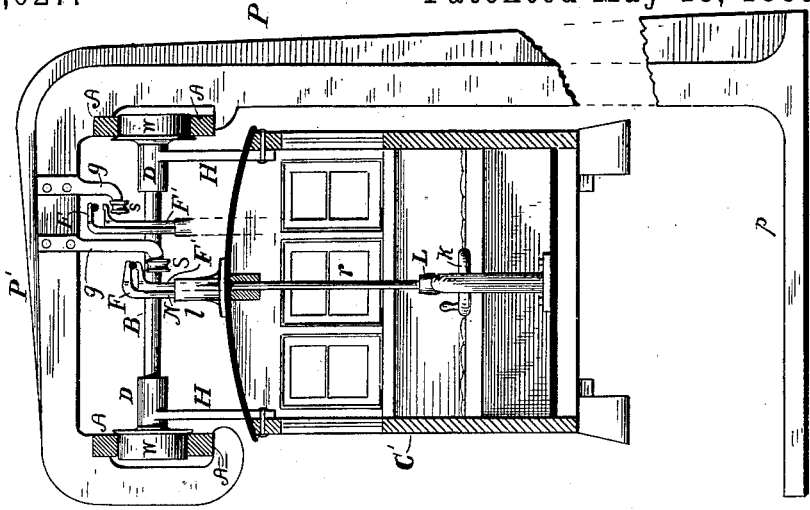
FIG. 3.
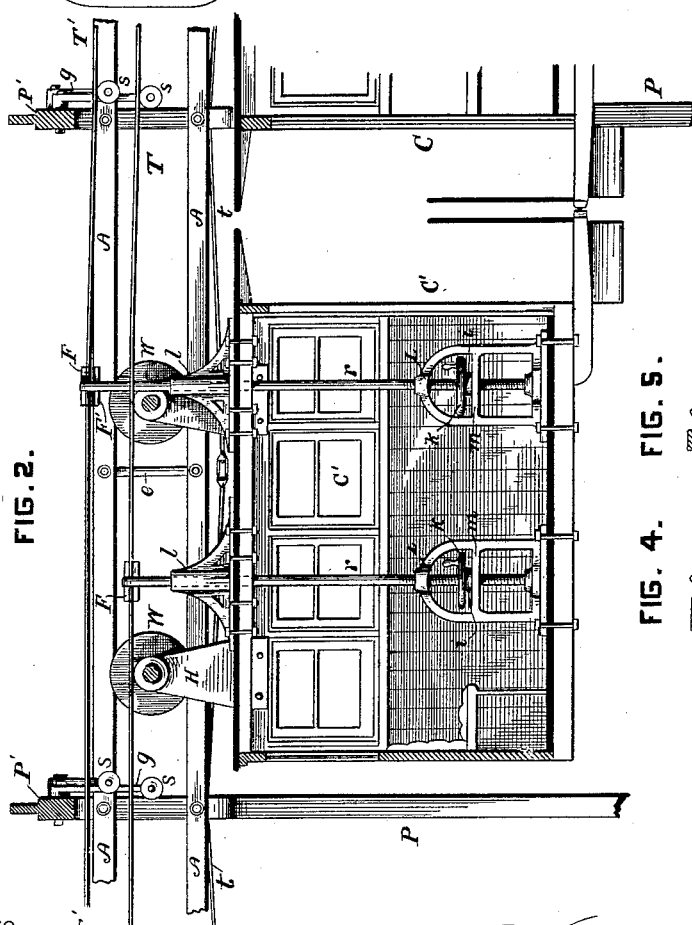
FIG. 2.
FIG. 5.
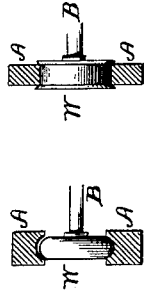
FIG. 4.
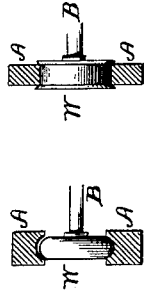
WITNESSES:
N. H. Cuenbra
John Burkhardt.
INVENTOR
William Pyle,
by his atty Joshua Pusey.

(No Model.) 3 Sheets—Sheet 3.

W. PYLE.
TRACTION ELEVATED RAILWAY.

No. 318,027. Patented May 19, 1885.

WITNESSES:
N. H. Culver
John Burkhardt.

INVENTOR
William Pyle
by his Atty Joshua Pusey.

N. PETERS, Photo-Lithographer, Washington, D. C.

UNITED STATES PATENT OFFICE.

WILLIAM PYLE, OF WILMINGTON, DELAWARE.

TRACTION ELEVATED RAILWAY.

SPECIFICATION forming part of Letters Patent No. 318,027, dated May 19, 1885.

Application filed February 15, 1883. (No model.)

*To all whom it may concern:*

Be it known that I, WILLIAM PYLE, a citizen of the United States, residing at the city of Wilmington, in the county of New Castle and State of Delaware, have invented certain new and useful Improvements in Elevated Railways, of which the following is a full, clear, and exact description, reference being had to the accompanying drawings, of which—

Figure 1:
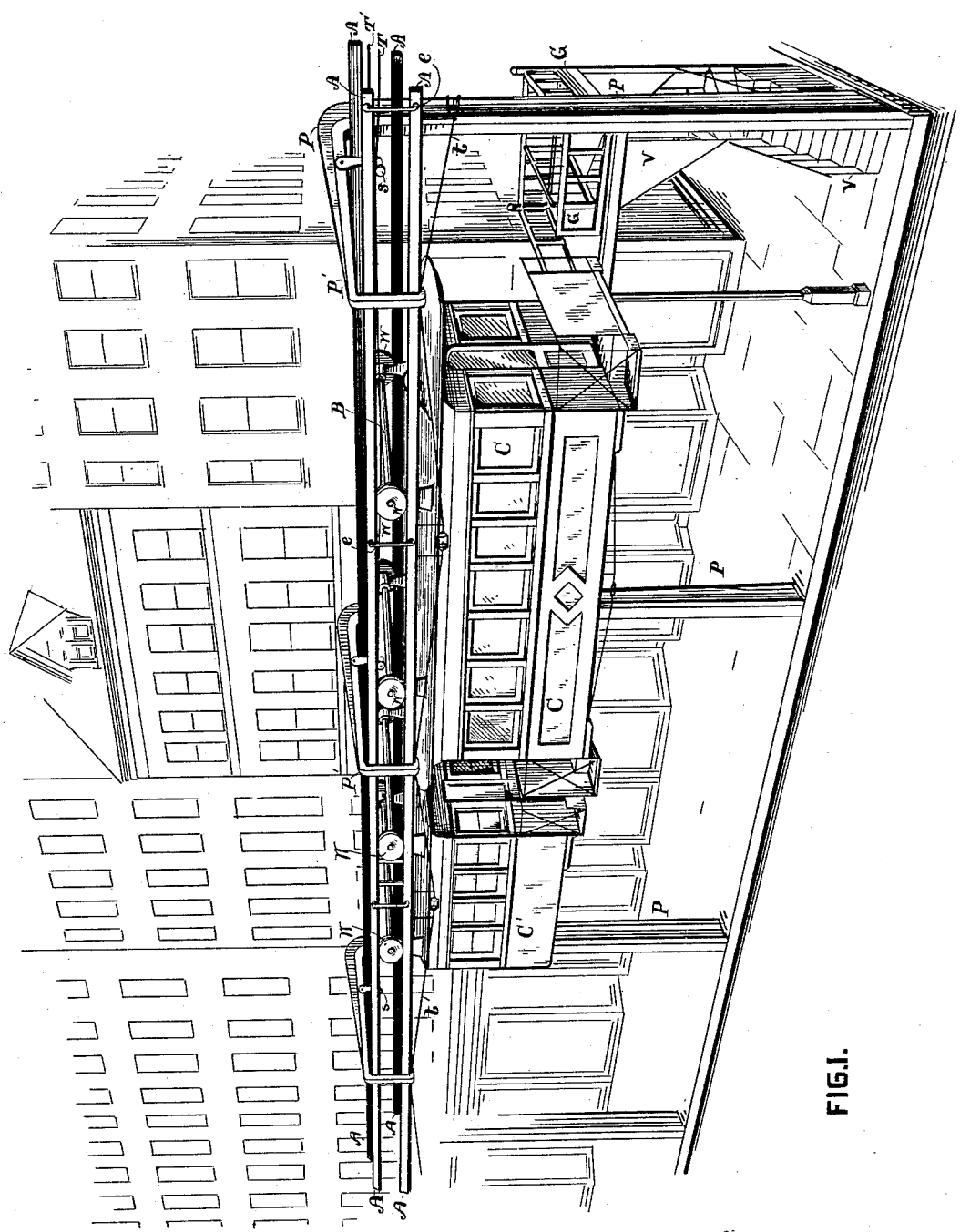
Figure 6:
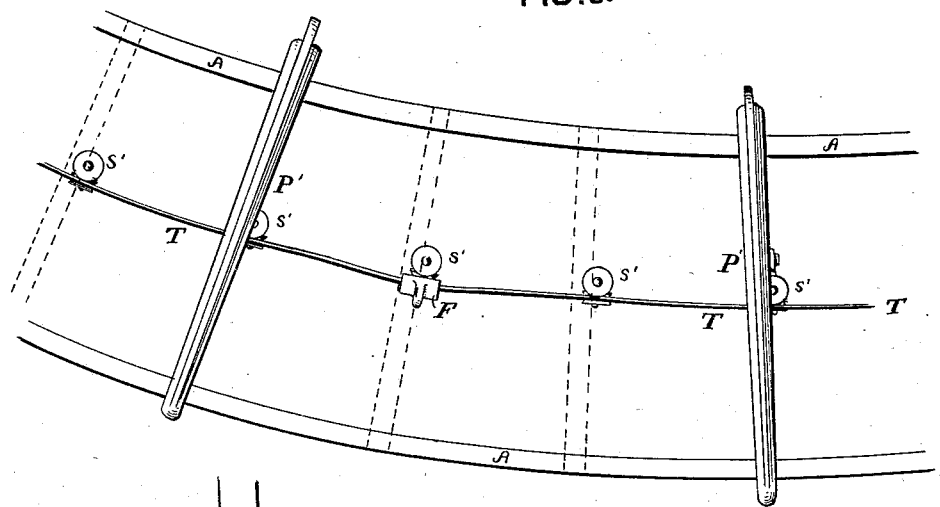
Figure 8:
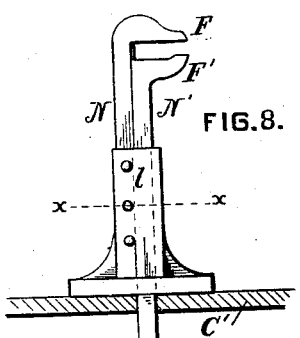
Figure 9:
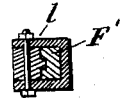

Figure 1, Sheet 1, is a perspective view of my invention as in operation in the streets of a city. Fig. 2, Sheet 2, is a transverse sectional view through the grip-car. Fig. 3, Sheet 2, is a longitudinal sectional view on a line passing through said car. Fig. 4, Sheet 2, represents the preferred form of rail and car-wheels to be used with my improved railway. Fig. 5, Sheet 2, is a modification of rail and car-wheel. Fig. 6, Sheet 3, is a plan showing the cable and gripping device as in passing around a curve. Fig. 8, Sheet 3, is an elevation of the gripping mechanism detached. Fig. 9, Sheet 3, is a section on the line $x$, Fig. 8; and Fig. 10, Sheet 3, shows the form of grippers adapted for use where there are alternate or different curves.

This invention relates generally to elevated railways, and also to what are known as "cable railways," it being an elevated cable railway of improved construction; but it will be obvious that that feature of my invention hereinafter described, consisting of the combination, with a car, of adjacant parallel cables driven at different speeds, with independent gripping devices, is equally applicable to the surface railways—such as are in use in San Francisco, Chicago, and other cities of the United States. The object of the same is to provide an elevated cable railway adapted especially for use in the streets of cities.

Referring to the accompanying drawings, A are two pairs of rails, one of each pair vertically in line with its fellow, and the distance between the upper and lower rails being a little more than the diameter of the tread of the car-wheels. These rails are secured to the overhanging part P′ of a series of posts, P, planted at suitable distances apart along the street, near the curbs, as seen in Fig. 1. The bases of the posts are beneath the surface of the street, extending out in line beneath the overhanging part above the ground, as shown in Fig. 3, so as to better aid in counteracting the weight of the cars, &c., suspended from the posts. The latter, as all parts of the structure and the cars, should be made with a view to securing the best combination of strength and lightness. The cars C C′ are suspended by hangers H from the axles B of the car-wheels W, so that the axles will freely turn in their bearings D. The elevation of the posts P should be such as to bring the lower parts of the cars a sufficient distance above the surface of the street to escape any ordinary loaded team or other usual temporary obstruction.

In order to keep the lower of the rails from sagging away from the upper one, from the weight of the cars or otherwise, I span each pair between the posts with brackets $e$, and I also stiffen the lower rails by means of trusses $t$.

The car-wheels W may be made in the usual form—that is, with inside flanges, as seen in Figs. 1, 2, and 3; but I prefer to make them with both an outside and an inside flange, as in Fig. 5. The object of this is to hold the rails in place, and to prevent any possibility of their spreading at any point during the passage of the cars. The modification of a convex-faced car-wheel with grooved rail, as in Fig. 4, might be used in some cases.

The cars are propelled by means of a cable, T, driven in the manner usual with cable railways, which is supported between the tracks by means of sheaves S, sustained by hangers $g$, let down from the overhanging part P′ of the posts. One of the cars C, termed the "grip-car," carries the devices for clamping and releasing the moving cable, whereby the cars may be caused to travel forward and to be stopped, with the aid of a suitable brake, (not shown,) at pleasure. These gripping devices are preferably constructed as shown in Figs. 2 to 10, inclusive, in which F is the fixed part or jaw at the extremity of an arm, N, which is secured to and extends above the top of the car C′.

F′ is the lower and movable jaw at the end of a similar arm, N′, sliding in a guide, $l$, and terminating in a rod, $r$, within the car or elsewhere, within reach of the engineer or operator. It is operated to move up, so as to clamp the cable between the upper and lower jaws by means of a hand-wheel, K, working within a frame, L, upon the threaded portion of the rod. This hand-wheel is held in position by a collar, i, secured to the cross-bar m of frame L. Other means for causing the closing and opening of the gripper-jaws may be employed, such as any skilled mechanic can readily apply. It is preferred to have the lower of the grip-jaws movable, in order that it may be drawn away from the cable from below, so that the sag of the latter, when released, will not touch the jaw. Where the line of the railway is straight, the cables are supported simply by horizontally-placed sheaves S; but in rounding curves it is necessary to provide vertical or side sheaves, S', for the cables to bear against. The grip-jaws are at such an elevation above the top of the car that the under side of the lower jaw, F', cannot strike, but will safely clear the sheaves S, and they are set back also, so as to avoid striking the side sheaves, S'. (See Figs. 6, 7, and 10.)

Figure 7:
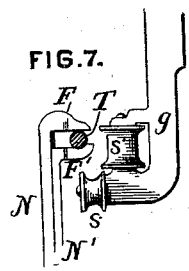
Figure 10:
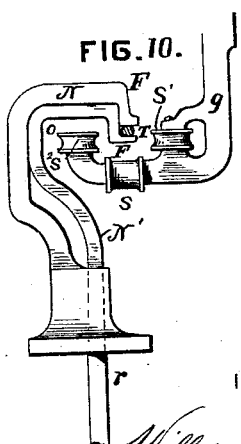
Figure 10:
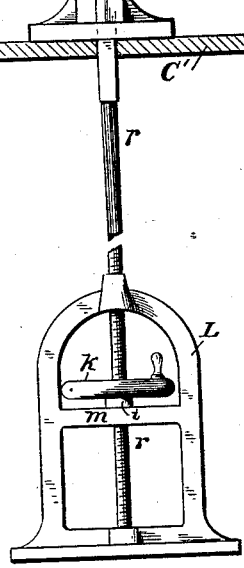

Fig. 7 shows the form and arrangement of grippers with relation to the sheaves where the curves are in one direction only—say to the right, as in Fig. 6; but when the curves are in different or alternate directions, and the bearing of the cable curves now on one side, now on the other, it becomes necessary to make a bend or loop, O, Fig. 10, in the arms N N', which carry the respective jaws of the grippers, in order that said arms may not strike the side sheaves, S², and their brackets or hangers g, but will pass over and around them. This construction is clearly shown by Fig. 10, Sheet 3.

Reference to Figs. 1, 2, and 3 (shown most clearly in the latter) will discover a second cable, T', located to the side of and above the previously-mentioned cable T, and that the car C' also carries a duplicate of the described gripping and releasing mechanism. This cable T' is driven in like manner and in the same direction as cable T, but at a considerably-increased speed. The design of thus providing a slow and a fast cable on the same railway is to enable the cars, by letting go the former and taking hold of the latter, to make up for any lost time—that is, in effect, to keep the numerous cars on the line more evenly distributed in some cases, and quickly massed together at one or more desired points, than can well be done when a single cable is used. For example, cars may be required to halt a considerable time at some point or points on the line—as where a place of amusement has let out—whereas the just preceding cars, having missed the crowd, will run comparatively light. By hitching onto the fast cable the first-mentioned cars could quickly make up the time of the extraordinary detention.

Another apparent advantage in providing a fast and a slow cable in connection with gripping devices upon the car or grip-car is that the cars may be started at a slow speed by gripping onto the slow cable, and then run at the fast speed by releasing the grip upon the former cable and seizing the other or fast cable by its corresponding gripping device. Passengers enter and leave the cars by platforms G and steps V leading up thereto, Fig. 1, located at any desired intervals on the line of the road. I also purpose using steps secured to the cars, and which may be let down to the street for the reception and exit of passengers at any point, by means of suitable devices within or connected with the cars. Such a device may form the subject for future application of Letters Patent by me.

I am aware of the fact that it is not novel to use for propelling cars two cables running at different speed, for such have been previously described—for instance, in British Letters Patent, No. 1,526, of the year 1866. I therefore do not claim the same broadly; but

What I claim as new, and wish to secure by Letters Patent is—

1. In an elevated railway, the rails supported by overhanging posts, the car or dummy suspended below the rails from the axles of the wheels, the adjacent endless parallel cables driven at different speeds, together with suitable independent grippers connected to said car or dummy, for gripping and releasing either cable at will, all combined, constructed, and adapted to operate substantially as and for the purposes set forth.

2. The combination, with a car, of the adjacent parallel cables driven at different rates of speed, together with independently-operating gripping and releasing devices connected to said car, substantially as and for the purposes described.

3. The combination of a fast and a slow moving cable with a car running upon a track, and independent gripping devices for connecting the car with either cable, substantially as and for the purpose described.

4. The improvement in propelling cars, consisting in first connecting the same by a gripping device, substantially as described, with a slow-moving cable to start the car, and afterward releasing said gripper from the slow-moving cable, and then gripping the fast-moving cable, substantially as and for the purposes set forth.

In testimony whereof I have hereunto affixed my signature this 31st day of January, A. D. 1883.

WILLIAM PYLE.

Witnesses:
 CLIFFORD PYLE,
 WALTER PYLE.